Figure 1:
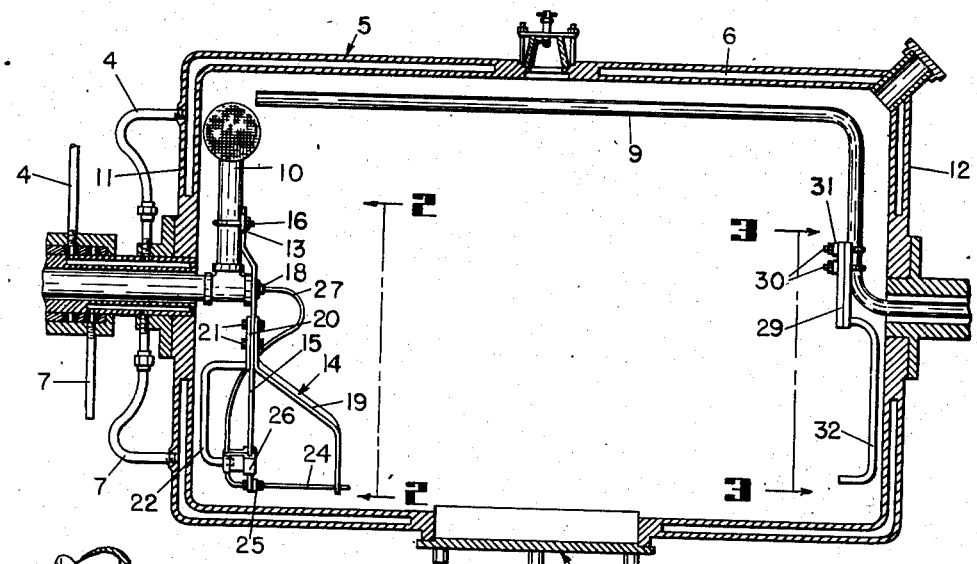

Nov. 28, 1944.  S. T. FAUVER  2,363,949
CHURN CLEANING APPARATUS
Filed July 22, 1942

Inventor
Stanley T. Fauver

Attorney

Patented Nov. 28, 1944

2,363,949

UNITED STATES PATENT OFFICE 2,363,949

CHURN CLEANING APPARATUS

Stanley T. Fauver, Painesville, Ohio, assignor to Industrial Rayon Corporation, Cleveland, Ohio, a corporation of Delaware Application July 22, 1942, Serial No. 451,981

5 Claims. (Cl. 259—88)

This invention relates to rotating mixing or reaction vessels such as, for example, a xanthating churn and it provides a new apparatus for reducing the tendency of materials to adhere to the inner walls of such vessels.

In the employment of rotating mixing or reaction vessels it is frequently found that when the materials in such vessels are of a crumbly, moist character, there is a tendency for the materials to adhere to the walls of the vessel particularly when the inner walls of such vessels, as frequently is the case, are rather rough in character. Thus, for example, in the production of sodium cellulose xanthate in the viscose rayon industry it is customary to react soda cellulose with carbon disulfide in a horizontally disposed revolving cylindrical reaction vessel. The sodium cellulose xanthate is in the form of an orange, moist, crumbly mass which in general tends to adhere to the walls of the rotating reaction vessel in the form of a cake. This caked-out material is usually not attached so lightly as to be dislodged by ordinary brushing and generally requires strenuous manual scraping to effect its removal.

The present invention provides an apparatus by means of which the tendency of materials such as sodium cellulose xanthate to adhere to the side walls of a rotating vessel or churn may be substantially reduced. In accordance with this invention, an arm-like member is placed inside the rotating vessel, the member being positioned adjacent to an end wall of the vessel and extending from substantially the axis of the vessel to a point adjacent its side wall. As applied to a substantially cylindrical rotating vessel such as a xanthating churn, the invention includes two arm-like members inside the churn disposed one at each end thereof; each of the members is adjacent, and advantageously roughly parallel, to an end wall of the churn and extends from substantially the axis of the churn to a point adjacent to its side wall.

The arm-like members within the rotating vessel, e. g., a xanthating churn, are advantageously positioned so that the free ends of the members are adjacent to the upwardly moving side wall of the vessel. In addition, the position of these members is advantageously such that their ends are within an angle of about 30° to about 100° as measured from a perpendicular dropped from the axis of the vessel.

The proper distance to be maintained between the end wall and its cooperating arm-like member so that the material within the vessel is substantially prevented from adhering to the end wall will vary depending upon the nature of the material within the churn. Simple experimentation will readily disclose the most desirable spacing for a particular material. Thus, in a xanthating churn, it is found that a distance of about one to two inches between the arm-like member and the end of the vessel may be employed with advantage. In general, however, the arm-like member should not be positioned so close to the ends of the rotating vessel as to be in actual contact therewith.

Figure 2:
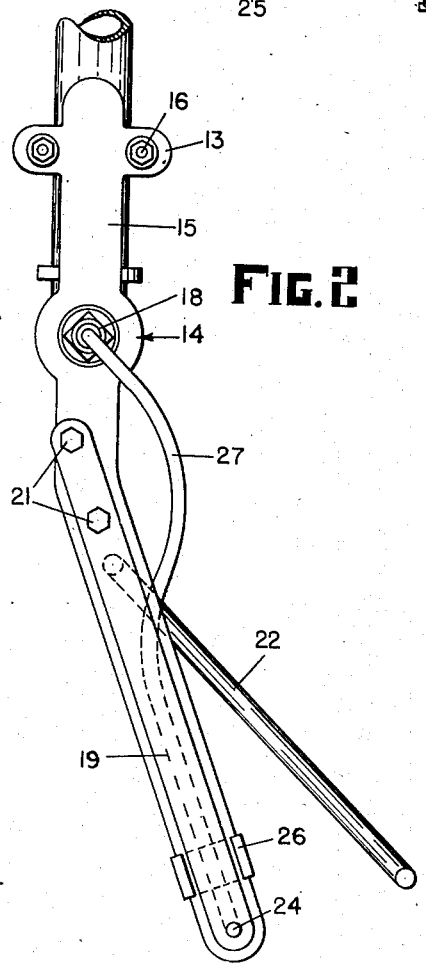
Figure 3:
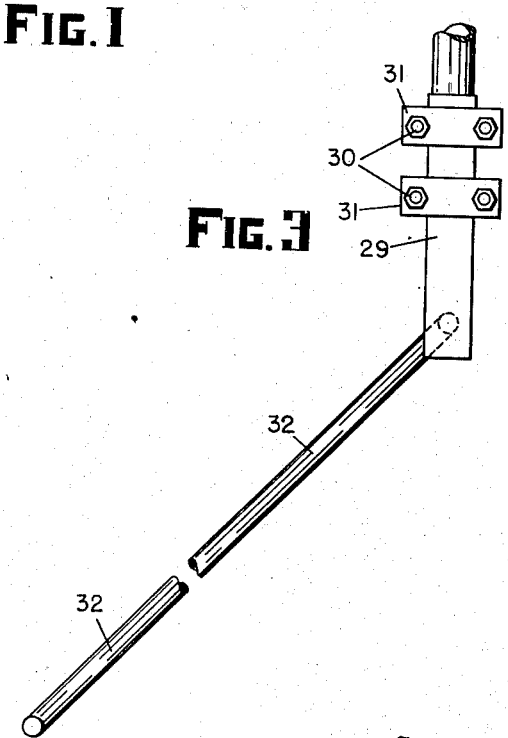

The invention will be further described by reference to the accompanying drawing in which Figure 1 is a longitudinal section of one form of xanthating churn equipped with the new apparatus of this invention; Figure 2 is an elevation of the device of Figure 1 as seen from line 2—2 of Figure 1; and Figure 3 represents the device of Figure 1 as seen from line 3—3 of Figure 1.

The accompanying drawing shows a xanthating churn consisting of a generally cylindrical drum 5 rotatably supported by two hubs at each end thereof, and having a cooling jacket 6 through which a cooling medium is circulated by means of pipes 4 and 7. In the xanthating process in which such apparatus is commonly used, soda cellulose in the form of crumbs is introduced through manhole 8. After sealing the manhole, carbon disulfide is introduced into the vessel through inlet conduit 9 which extends through its adjacent hub. The drum 5 is then rotated until the reaction is complete. Excess carbon disulfide is exhausted through the exhaust pipe or conduit 10 and the sodium cellulose xanthate formed is discharged through manhole 8.

To reduce the tendency of the sodium cellulose xanthate to adhere to the walls of the churn, in accordance with the invention, an arm-like member 32 is provided adjacent to the end wall 12 of the churn. This member, in the form of a cylindrical rod bent into a somewhat U-shaped form, is roughly parallel to end wall 12 and the side wall of the churn. The member 32 is supported by conduit 9 through the intermediary of a bar member 29 to which it is attached by welding or otherwise. Bar member 29, which may be trough-shaped to fit more snugly against conduit 9, is secured to said conduit by means of U-bolts 30 which pass through strip washers 31.

At the opposite end 11 of the churn means are provided for recording the temperature within the churn. An arm-like member for reducing the tendency of the sodium cellulose xanthate to adhere to the walls of the churn is advantageously held in position within the churn by being secured to this temperature recording device. For convenience, the temperature recording device and the associated arm-like member will be referred to as assembly 14. The latter assembly is mounted on exhaust pipe 10 by means of U-bolt 16 inserted through projecting lugs 13 on bar 15 which is further secured to exhaust pipe 10 by drilled pipe plug 18. Assembly 14 comprises bar 15 from which extends a somewhat U-shaped rod 22. This rod may be directly welded to bar 15 or otherwise suitably mounted thereon such as, for example, by welding rod 22 to plate 20 which may then be mounted on bar 15 by bolts 21. Rod member 22, similar to rod member 32, is shaped so as to be roughly parallel to the end and side walls of the churn.

The temperature recording means in assembly 14 comprises a temperature recording bulb 24 having one end supported by strap 19 which may be mounted on bar 15 by means of the same bolts 21 employed in securing plate 20 to bar 15. The other end of the temperature recording bulb 24 projects through bar 15 and may be secured thereto by demountable fitting 25. Tube 27, which serves to connect temperature recording bulb 24 through the drilled pipe plug 18 with suitable externally mounted temperature recording means (not shown), is supported by clamp 26 mounted on bar 15.

The arm-like rod members 22 and 32 are positioned so that their free ends are adjacent to the upwardly moving side wall of the churn. The rod members positioned in this portion of the churn are also disposed so that their ends lie within an angle which is advantageously between about 30° and about 100° as measured from a perpendicular dropped from the axis of the churn. An angle of about 60°, as measured on the same basis, may be used with particular advantage. The arm-like rod members need not be in the same phase, i. e., parallel to one another, but operations may be carried out with advantage when the rod members are positioned in this manner.

The distance between the arm-like members 22 and 32 and the respective end walls 11 and 12 to which they are adjacent is advantageously about one or two inches, and the distance between the free ends of these members and the side wall of the churn is advantageously about the same, or it may be even greater, e. g., as much as about three inches. The arm-like members should not be placed so close to the end or side walls as to scrape these walls.

Despite the fact that the arm-like members 22 and 32 are spaced away from the end and side walls of the churn they are remarkably effective in reducing the tendency of the sodium cellulose xanthate to adhere to these walls. It is not certain just why these members should function so effectively. A possible explanation appears to be that the arm-like members impart a more or less positive rolling action to the xanthate particles which aids in forcing the particles away from the walls of the churn. The churn in its normal operation revolves slowly and the loose, crumbly, moist particles lying in the bottom of the churn, follow naturally up the side, as the churn rotates, until the particles reach such an elevated position that gravity causes them to tumble back to the bottom. By imparting a rolling action to the xanthate particles, the adhering material apparently tends to be removed more positively than if gravity alone is relied upon to cause the particles to drop away from the churn walls. That positive rolling action is imparted to the xanthate particles by the arm-like members is suggested by the manner in which these arms, even though located adjacent to the ends of the churn, spread their effect over substantially the entire length of the churn thereby reducing the amount of adherence of the particles substantially throughout.

Although the arm-like members do not function by scraping the walls of the churn since they are not in contact therewith, a certain amount of rubbing action may occur. Thus, at various points a small amount of the crumbly and loose sodium cellulose xanthate may crowd under the free end of the arms and cause a limited amount of rubbing action which may, however, be sufficient to remove a few of the particles adhering to the churn wall at that point.

Although the foregoing description is concerned with the application of the invention to xanthating churns it is to be understood that the invention is not limited thereto but may be applied to other types of rotating reaction vessels or mixing devices which are used for mixing or reacting materials which tend to adhere to the walls of the vessels.

Similarly, the arm-like members 22 and 32 which, as illustrated, are in the form of cylindrical rods may be made of materials of non-circular cross section. Furthermore, the arm-like members need not necessarily extend in a substantially straight manner from a point near the axis of the rotating vessel to the side wall thereof but may be curved or assume other shapes if desired.

So, too, the free end of each of the arm-like members need not necessarily be substantially parallel to the side wall of the rotating vessel. For some purposes, it may be desirable to have the free ends askew with respect to the side wall. Similarly, the free end may extend in various directions forming different shapes such as, for example, T, V, or other forms.

I claim:

1. In a reaction vessel rotatably supported by two hubs, one at each end thereof, said vessel having a conduit extending through at least one of said hubs into the interior of said vessel, the improvement in apparatus for reducing the tendency of materials to adhere to the walls of said vessel comprising an arm-like member supported inside said vessel by said conduit, said member being adjacent to an end wall of said vessel and extending from substantially the axis of said vessel to a point adjacent to the side wall of said vessel.

2. In a substantially cylindrical reaction vessel rotatably supported by two hubs, one at each end thereof, said vessel having two conduits, one extending through each of said hubs into the interior of said vessel, the improvement in apparatus for reducing the tendency of materials to adhere to the walls of said vessel comprising two arm-like members supported inside said vessel by said conduits and disposed one at each end thereof, each of said members being adjacent to an end wall of said vessel and extending from substantially the axis of said vessel to a point adjacent to the side wall of said vessel.

3. In a substantially cylindrical reaction vessel rotatably supported by two hubs, one at each end thereof, said vessel having at least one conduit extending through said hubs into the interior of said vessel, the improvement in apparatus for reducing the tendency of materials to adhere to the walls of said vessel comprising two arm-like members supported inside said vessel by said conduits and disposed one at each end thereof, each of said members being adjacent and roughly parallel to an end wall of said vessel and extending from substantially the axis of said vessel to a point adjacent to the side wall of said vessel.

4. In a substantially cylindrical xanthating churn rotatably supported by two hubs, one at each end thereof, said churn having two conduits, one extending through each of said hubs into the interior of said churn, the improvement in apparatus for reducing the tendency of materials to adhere to the walls of said churn which comprises two arm-like members inside said churn and disposed one at each end thereof, one of said members being supported by one of said conduits and the oppositely disposed member being supported by the other conduit, each being adjacent and roughly parallel to an end wall of said churn and extending from substantially the axis of said churn to a point adjacent to the upwardly moving side wall of the churn.

5. Apparatus as in claim 4 in which the ends of said arm-like members adjacent to the side wall of the churn are positioned within an angle of about 30 to 100° as measured from a perpendicular dropped from the axis of said churn.

STANLEY T. FAUVER.

CERTIFICATE OF CORRECTION.

Patent No. 2,363,949.  November 28, 1944.

STANLEY T. FAUVER.

It is hereby certified that error appears in the printed specification of the above numbered patent requiring correction as follows: Page 3, first column, line 4-5, claim 3, for the word "conduits" read --conduit--; and second column, line 5, claim 4, after "each" insert --of said members--; and that the said Letters Patent should be read with this correction therein that the same may conform to the record of the case in the Patent Office.

Signed and sealed this 20th day of February, A. D. 1945.

Leslie Frazer (Seal)　　　　　　　　　　　　　　Acting Commissioner of Patents.